United States Patent [19]

Ishikura et al.

[11] Patent Number: 5,123,767
[45] Date of Patent: Jun. 23, 1992

[54] ATTACHING MECHANISM FOR PROTECTIVE BAR OF BABY CARRIAGE

[75] Inventors: Takashi Ishikura; Tatsuo Nakamata, both of Tokyo, Japan

[73] Assignee: Combi Corporation, Tokyo, Japan

[21] Appl. No.: 755,946

[22] Filed: Sep. 6, 1991

[30] Foreign Application Priority Data

Sep. 17, 1990 [JP] Japan .................. 2-96533[U]

[51] Int. Cl.$^5$ .............................................. F16B 1/00
[52] U.S. Cl. ................................. 403/24; 403/324; 403/348; 280/47.38
[58] Field of Search ............... 403/323, 324, 348, 24; 280/642, 658, 47.38

[56] References Cited

U.S. PATENT DOCUMENTS

| | | | |
|---|---|---|---|
| 4,292,003 | 9/1981 | Pond | 403/348 X |
| 4,877,125 | 10/1989 | Gordon | 403/348 X |
| 5,004,253 | 4/1991 | Nakao et al. | 280/47.38 |

*Primary Examiner*—Andrew V. Kundrat
*Attorney, Agent, or Firm*—Sughrue, Mion, Zinn, Macpeak & Seas

[57] ABSTRACT

A mechanism for attaching the protective bar (1) of a baby carriage to the armrest bars (2) thereof. The mechanism includes fitting juts (3) respectively provided in the armrest bars at opposite ends thereof and engaged in fitting holes (5) provided in the protective bar and engagement bolts (4) rotatably inserted into the bolt holes (11) of the armrest bars and into the bolt holes (61) of the juts so that the protective bar is detachably attached to the armrest bars. Each of the bolts has a head (41) at a butt end thereof and an engagement pin (43) at an opposite tip end of the bolt so that the longitudinal axis of the pin is substantially perpendicular to the longitudinal axis of the bolt. Each of the bolt holes (61) has peripheral openings at one end thereof so that the pin can be passed through the openings and each of the juts has projections (63) at the peripheral portion of the bolt hole (61) near the other end thereof so that the projections are engaged with the pin to hold the bolt. Finally, each of the juts has notches between the projections so that the positions of the notches correspond to those of the openings and the pin can be passed through the notches.

6 Claims, 4 Drawing Sheets

ATTACHING MECHANISM FOR PROTECTIVE BAR OF BABY CARRIAGE

BACKGROUND OF THE INVENTION

1. Field of the Invention

The present invention relates to a mechanism for attaching a protective bar of a baby carriage to the front of the sitting unit thereof.

2. Background

Japanese Utility Model Application (OPI) No. 100265/87 (the term "OPI" as used herein means an unexamined published application) discloses attaching a U-shaped protective bar to the ends of armrest bars on both sides of the sitting unit of a baby carriage so as to extend across the front of the carriage to prevent a baby from falling therefrom. The younger the baby, the more important it is to use the protective bar. When the baby has grown such that the protective bar is not required, it is detached. For that reason, it is necessary that the protective bar be optionally attachable to and detachable from the armrest bars. However, since the mechanism for attaching the protective bar to the armrest bars needs to be designed such that the protective bar cannot be detached from the armrest bars by the baby in the sitting unit, the design of the mechanism is so complicated that it is troublesome to attach and detach the protective bar to and from the armrest bars and the cost of the mechanism is high.

SUMMARY OF THE INVENTION

Accordingly, it is an object of the present invention to provide a simple mechanism for attaching the protective bar of a baby carriage to the armrest bars thereof in such a manner that the protective bar cannot be easily detached from the armrest bars by the baby.

In the mechanism provided in accordance with the present invention, fitting juts provided on one of the ends of the armrest bars or the ends of the protective bar are engaged in fitting holes provided in the other of the protective bar or the armrest bars. Engagement bolts, each of which has a head at one end and an engagement pin at the other end so that the longitudinal axis of the pin is perpendicularly to the axis of the shank of the bolt, are inserted into the bolt holes of the fitting juts. The engagement pins are engaged on projections provided in the fitting juts at the ends of the bolt holes thereof. Notches, through which the engagement pin is passed, are provided between the projections.

BRIEF DESCRIPTION OF THE DRAWINGS

The drawings illustrate a mechanism which is an embodiment of the present invention and is for attaching the protective bar of a baby carriage to the armrest bars thereof.

DETAILED DESCRIPTION OF A PREFERRED EMBODIMENT

Figure 1:
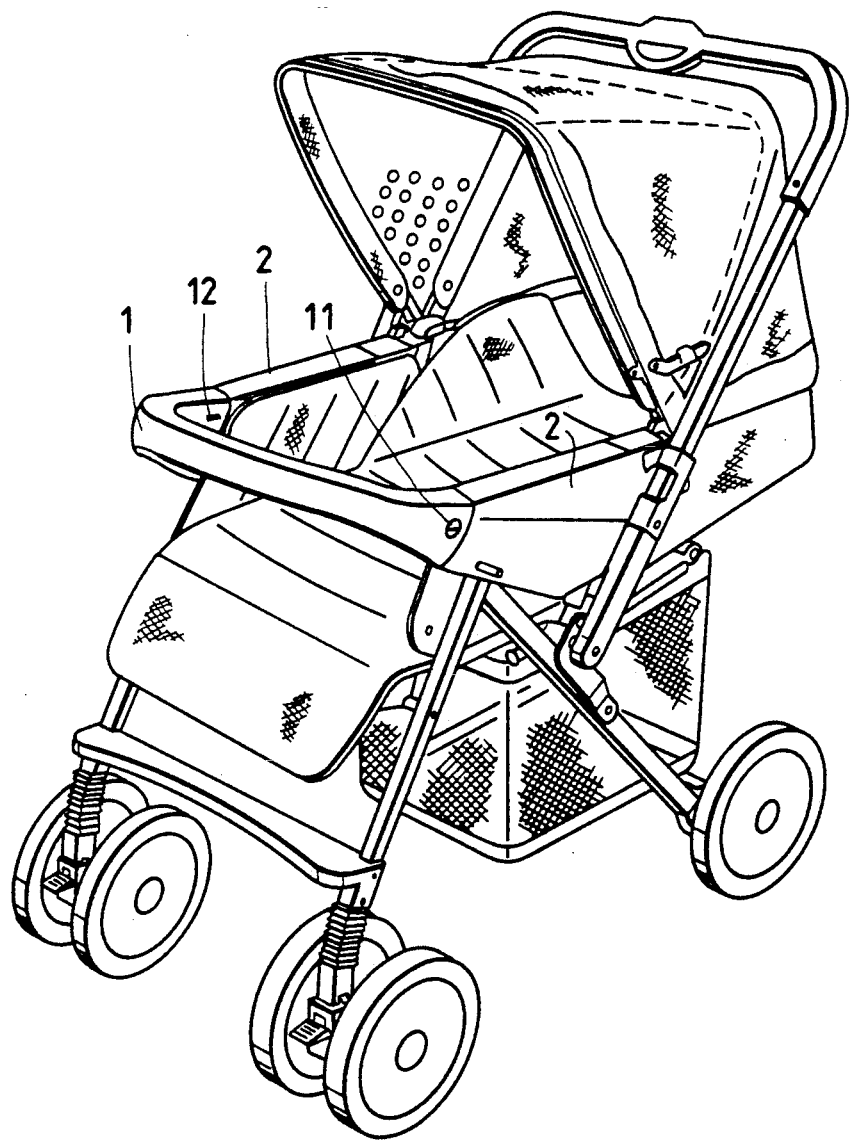
FIG. 1 is a perspective view of the mechanism in the state where the protective bar is attached to the armrest bars by the attachment mechanism.

An embodiment of the present invention is hereinafter described with reference to the drawings attached hereto.

FIGS. 1–7 illustrate a mechanism for attaching the protective bar 1 of a baby carriage to the ends of the armrest bars 2 thereof. The mechanism includes fitting juts 3 provided on the ends of the armrest bars 2, engagement bolts 4, and fitting holes 5. The engagement bolts 4 are inserted into the protective bar 1 and the fitting juts 3 to attach the protective bar at both ends thereof to the juts so as to keep the bar from coming off the juts and to allow for detachment of the bar therefrom.

Figure 2:
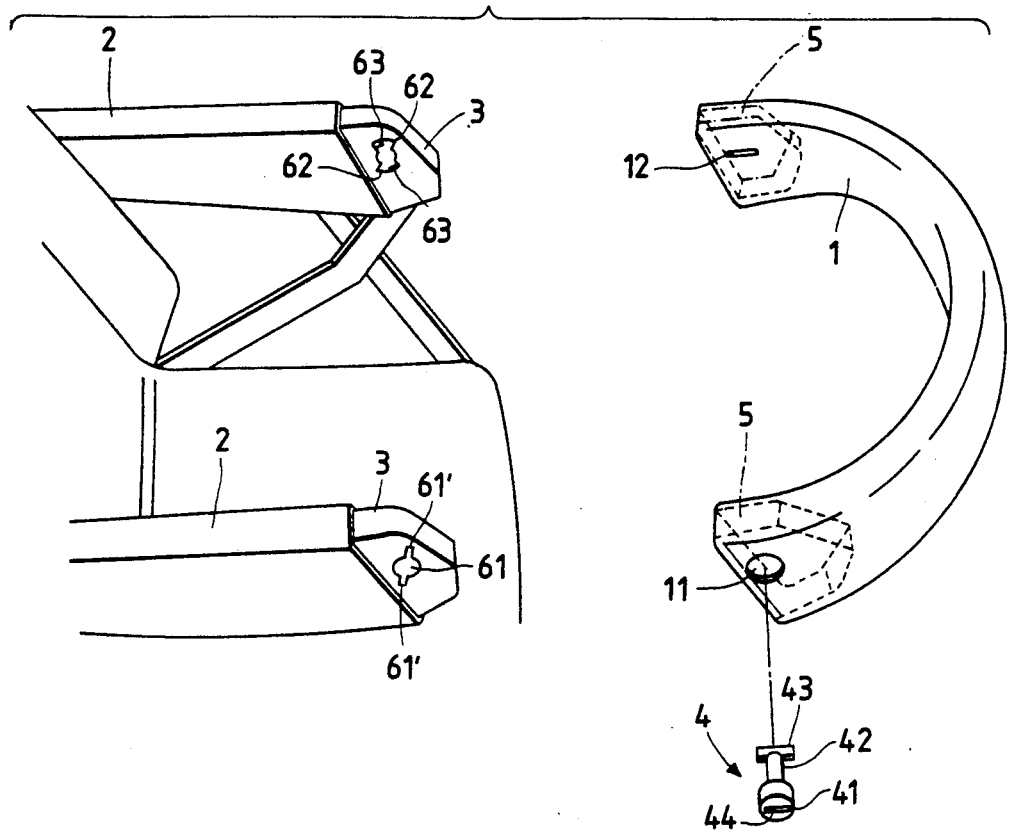
FIG. 2 is a perspective view of the mechanism in the state where the protective bar is unattached to the armrest bars.
Figure 3:
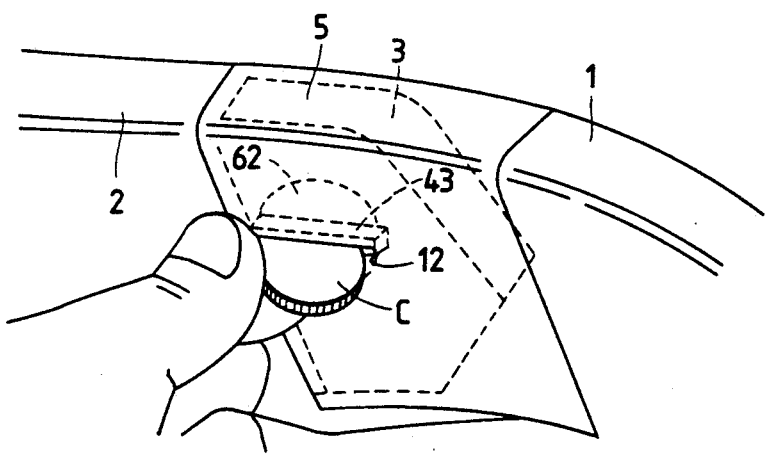
FIG. 3 is a perspective view of the mechanism in the state where detachment of the protective bar from the armrest bars is started.
Figure 4A:
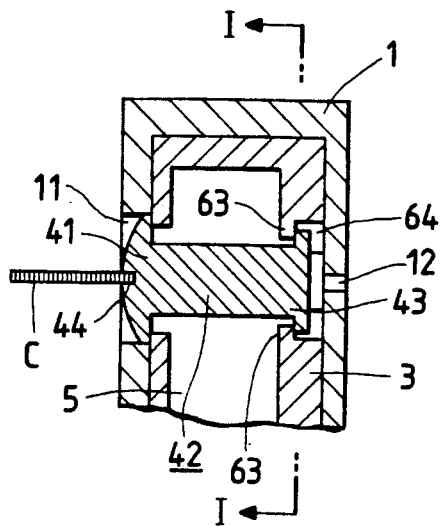
FIG. 4(A) is a sectional view of the mechanism in the state shown in FIG. 3.

In more detail, the protective bar 1 is substantially U-shaped and has the fitting holes 5 at both ends thereof. The fitting juts 3 are engaged in the fitting holes 5 to attach the protective bar 1 to the armrest bars 2. Bolt holes 11, into which the engagement bolts 4 are inserted, are provided in the outer portion of the protective bar 1 at both ends thereof outside the fitting holes 5. Manipulation slots 12 are provided on the inner portion of the protective bar, as illustrated in FIGS. 2 and 3. The manipulation slots 12 are provided to allow the user to push against the tip end of the engagement bolts 4 to remove the bolts from the protective bar 1 and the fitting juts 3. The diameter of each of the bolt holes 11 is equal to or slightly larger than the outside diameter of the head 41 of the engagement bolt 4 so that the bolt can be freely inserted into the bolt hole and the head 41 can be freely rotated in the hole as illustrated in FIG. 4(A). The manipulation slots 12 oppose the screw holes 11 and are sized such that the tip of a tool can be inserted into the manipulation hole to push the bolt from the hole. For example, the tool may include a coin C, about half of which can be inserted into the manipulation holes 12.

Each of the fitting juts has a through hole 61 provided in the outer surface thereof having a diameter sufficient to receive the shanks 42 of the engagement bolts 4. Each of the holes 61 has two peripheral openings 61' diametrically extending in opposite directions from each other across the axis of the hole. The distance between the outer ends of the openings 61' corresponds to the length of the engagement tip pin 43 of the engagement bolt 4 such that the pin 43 can pass therethrough.

Disposed in the inner surface of each of the fitting juts 3 is a pair of projections 63 diametrically opposing each other. The distance between the tips of the projections 63 corresponds to the outside diameter of the shank 42 of the engagement bolt 4 and the distance between the butts of the projections 63 corresponds to the length of the engagement tip pin 43 of the bolt 4. Additionally, each fitting jut 3 has notches 62 between the projections 63 so that the engagement tip pin 43 can be passed through the notches. Stoppers 64 are disposed between the projections 63 so as to control the angle of rotation of the pin 43 which is rotated on the surfaces of the projections 63 to lock the bolt 4 in place, as described in detail below.

The engagement bolt 4 has a manipulation groove 44 in the head 41 thereof for receiving the coin C in order to turn the bolt 4. Although the groove 44 is a single straight groove, intersecting grooves may be provided instead. Further, the shape and size of the manipulation hole 12 of the protective bar 1 and the manipulation groove 44 of the head 41 of the bolt 4 are designed depending on the diameter and thickness of the coin C, but they are not confined thereto.

Although the bolt holes 11 are provided in the outer portion of the protective bar 1 and the manipulation holes 12 are provided in the inner portion of the bar, the present invention is not confined thereto but may be otherwise embodied so that the bolt holes are provided in the inner portion and the manipulation holes are provided in the outer portion. In such an embodiment, the bolt holes 61 of the fitting juts 3, the peripheral openings 61', the notches 62, the projections 63 and the stoppers 64 are provided in such positions as to correspond to the bolt holes 11 of the protective bar 1 just as in the preceding embodiment.

Although the fitting juts 3 are provided on the ends of the armrest bars 2 and the fitting holes 5 are provided in the ends of the protective bar 1, the present invention is not confined thereto but may be otherwise embodied so that the fitting juts are provided on the ends of the protective bar and the fitting holes are provided in the ends of the armrest bars. In such an embodiment, the bolt holes 11 are provided in the armrest bars 2, and the bolt holes 61, the peripheral openings 61', the notches 62, the projections 63 and the stoppers 64 are provided in the fitting juts 3.

The operation of the mechanism is described in detail as follows. Specifically, the protective bar 1 is attached to the armrest bars 2 by the mechanism as follows:

(1) The fitting juts 3 provided on the armrest bars 2 are engaged in the fitting holes 5 provided in the protective bar 1, so that the protective bar is disposed on the juts.

(2) The engagement bolts 4 are thereafter inserted into the bolt holes 11 and 61 of the protective bar 1 and fitting juts 3, respectively, until the inner surfaces of the heads 41 of the bolts contact the sides of the juts.

Figure 6A:
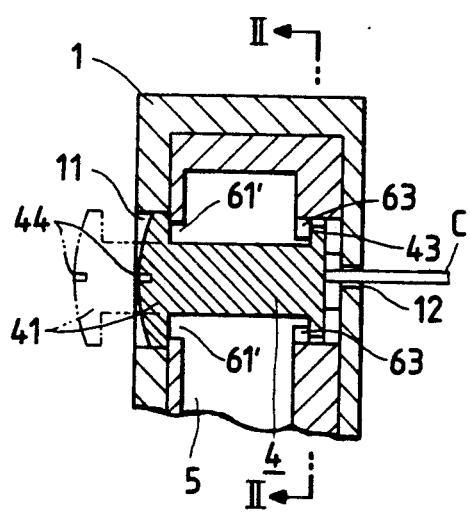
FIG. 6(A) is a sectional view of the mechanism in the state where an engagement bolt is rotated to detach the protective bar from the armrest bars.
Figure 6B:
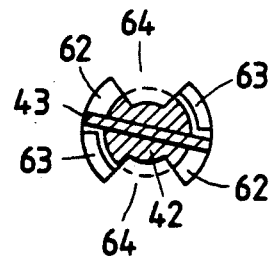
FIG. 6(B) is a sectional view of the mechanism along a line II—II shown in FIG. 6(A)
Figure 7:
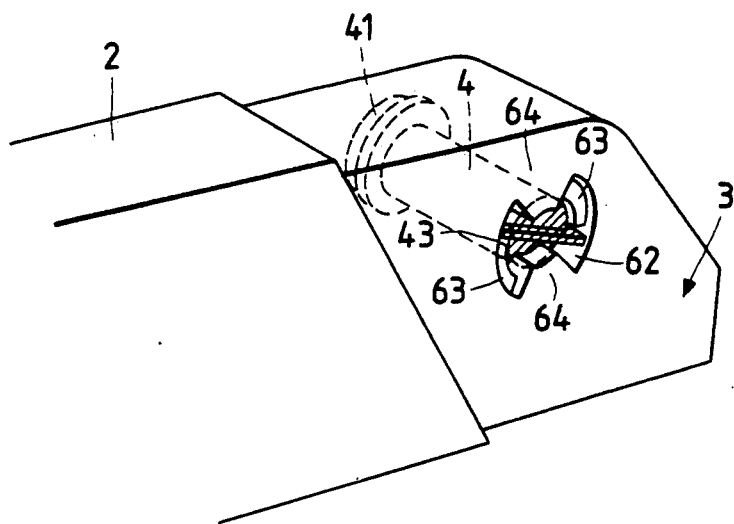
FIG. 7 is a perspective view of the mechanism in the state shown in FIGS. 6(A) and 6(B) with the protective bar omitted.

(3) As a result of the insertion, the engagement tip pins 43 of the bolts 4 are inserted into the notches 62 adjacent the projections 63 on the inside surface of the juts 3, as shown by the solid line in FIGS. 6A and 6B.

Figure 4B:
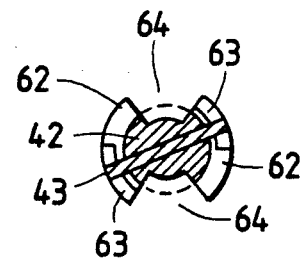
FIG. 4(B) is a sectional view of the mechanism along a line I—I shown in FIG. 4(A)
Figure 5:
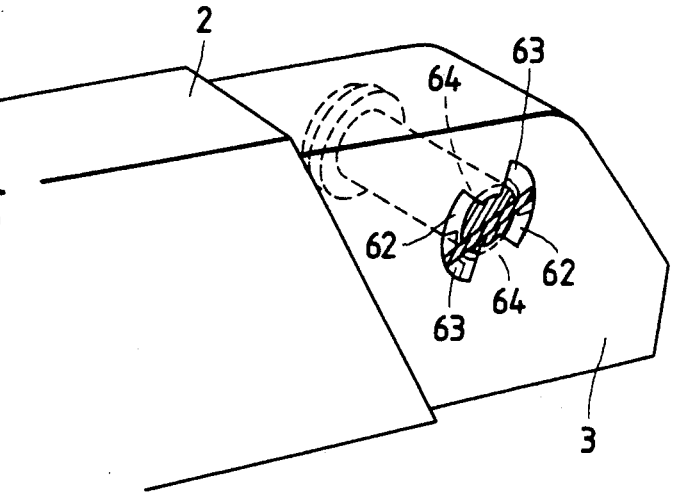
FIG. 5 is a perspective view of the mechanism in the state shown in FIG. 4(A), with the protective bar omitted.

(4) The peripheral portion of the coin C is thereafter inserted into the manipulation groove 44 of the head 41 of the bolt 4 and the coin is then rotated so that the engagement tip pin 43 of the bolt is rotated so as to slide along the outer surface of the projections 63 until the pin abuts against the stoppers 64 adjacent the projections, as shown in FIG. 5. As a result, the engagement tip pin 43 is supported on the inner surfaces thereof by the projections 63 so that the bolt 4 is prevented from disengaging from the bolt hole 61 of the fitting jut 3. Fitting each engagement bolt 4 in the protective bar 1 and the fitting jut 3 is thus completed, as shown in FIGS. 4(A) and 4(B), so that the protective bar is fastened to the armrest bars 2.

The protective bar 1 is detached from the armrest bars 2 as follows:

(5) For detaching, steps (1), (2), (3) and (4) are conducted in reverse order. Specifically, the peripheral portion of the coin C is first inserted into the manipulation groove 44 of the head 41 of the engagement bolt 4 and the coin is then rotated so that the pin 43 is rotated away from the stoppers 64.

(6) As a result, the pin 43 is slid along the outer surfaces of the projections 63 until it reaches the notches 62 whereupon the pin is disengaged from the projections.

(7) The peripheral portion of the coin C is thereafter inserted into the manipulation hole 12 provided in the inner portion of the protective bar 1, as shown in FIG. 6, so that the engagement bolt 4 is pushed with the coin. As a result, the head 41 of the bolt 4, which is located opposite the tip pin 43 of the bolt, is forced out of the bolt hole 11 of the protective bar 1, as shown by the two-dot chain line in FIG. 6.

(8) As a result, each engagement bolt 4 can be easily removed from each fitting jut 3 and the protective bar 1 with one's hand. The protective bar 1 can then be easily detached from the armrest bars 2.

The mechanism which is the embodiment of the present invention produces the following desirable effects:

(1) To attach the protective bar 1 to the armrest bars 2 only requires that the fitting juts 3 provided on the armrest bars be engaged by the fitting holes 5 provided in the protective bar, and the engagement bolts 4 be inserted into the protective bar and the fitting juts and rotated. The protective bar 1 can thus be easily attached to the armrest bars 2.

(2) Since the heads 41 and engagement tip pins 43 of the engagement bolts 4 fastening the protective bar 1 to the fitting juts 3 are recessed in the bolt holes 11 of the protective bars and the fitting juts so that the bolts are not exposed outside the bar and the juts, a baby sitting in the baby carriage is unlikely to toy with the mechanism. Therefore, the mechanism is extremely safe.

(3) Since the mechanism does not employ a spring, a securing screw mechanism or the like, the mechanism is simple in construction and therefore low in cost.

Figure 8:
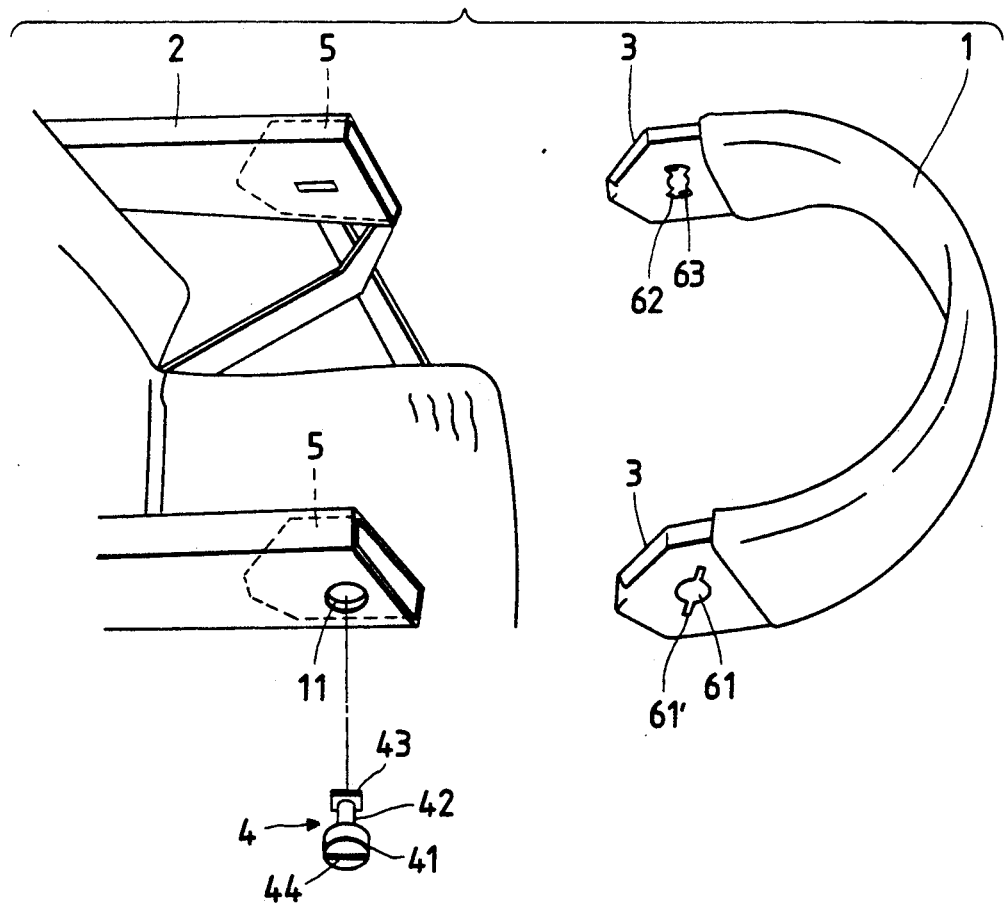
FIG. 8 is a perspective view showing another embodiment of the mechanism in which juts 3 are formed on the protective bar.

It is of course possible for those skilled in the art to modify the mechanism within the scope of the appended claims. For instance, the juts 3 may be formed on the protective bar 1 and the fitting holes 5 may be formed in the arm rest 2 as shown in FIG. 8 in which the same reference numerals are used to indicate the like members.

What is claimed is:

1. An apparatus for attaching a protective bar of a baby carriage to armrest bars thereof in a detachable manner, comprising:

fitting juts respectively provided in said armrest bars at opposite ends thereof and engaged in fitting holes provided in said protective bar, said fitting juts having a first bolt hole provided therein and said protective bar having a second bolt hole provided in opposite ends thereof; and engagement bolts rotatably inserted into said first and second bolt holes so that said protective bar is detachably attached to said armrest bars;

wherein each of said bolts has a head at an end of said bolt and an engagement pin at an opposite tip end of said bolt so that the longitudinal axis of said pin is substantially perpendicular to the longitudinal axis of said bolt; each of said first bolt holes has peripheral openings at one end of said bolt hole so that said pin can be passed through said openings; each of said juts has projections at the peripheral portion of said first bolt hole near the other end thereof so that said projections are engaged with said pin to hold said bolt; and each of said juts has notches between said projections so that the positions of said notches correspond to those of said openings and said pin can be passed through said notches.

2. The apparatus of claim 1, wherein said second bolt holes, into which said engagement bolts can be inserted, are provided outside said fitting holes; and a manipulation hole, into which a tool can be inserted to push said bolt on the end thereof from outside, is provided in each of said fitting juts inside said fitting hole and opposed to said second bolt hole.

3. The apparatus of claim 1, wherein said second bolt holes, into which said engagement bolts are inserted, are provided inside said fitting holes; and a manipulation hole, into which a tool can be inserted to push said bolt on the end thereof from outside, is provided in each of said fitting juts outside said fitting hole and opposed to said second bolt hole.

4. An apparatus for attaching a protective bar of a baby carriage to armrest bars thereof in a detachable manner, comprising:

fitting juts respectively provided on said protective bar at both ends thereof and engaged in fitting holes provided in said armrest bars at opposite ends thereof, said armrest bar having a first bolt hole provided in opposite ends thereof and said fitting juts having a second bolt hole provided therein; and engagement bolts rotatably inserted into the first bolt holes of said armrest bars and into said second bolt holes of said juts so that said protective bar is detachably attached to said armrest bars;

wherein each of said bolts has a head at an end of said bolt and an engagement pin at an opposite tip end of said bolt so that the longitudinal axis of said pin is substantially perpendicular to the longitudinal axis of said bolt; each of said second bolt holes has peripheral openings at one end of said second bolt hole so that said pin can be passed through said openings; each of said juts has projections at the peripheral portion of said second bolt hole near the other end thereof so that said projections are engaged with said pin to hold said bolt; and each of said juts has notches between said projections so that the positions of said notches correspond to those of said openings and said pin can be passed through said notches.

5. The apparatus of claim 4, wherein said first bolt holes, into which said engagement bolts can be inserted, are provided outside said fitting holes; and a manipulation hole, into which a tool can be inserted to push said bolt on the end thereof from the outside, is provided in each of said fitting juts inside said fitting hole and opposed to said first bolt hole.

6. The apparatus of claim 4, wherein said first bolt holes, into which said engagement bolts can be inserted, are provided inside said fitting holes; and a manipulation hole, into which a tool can be inserted to push said bolt on the end thereof from outside, is provided in each of said fitting juts outside said fitting hole and opposed to said first bolt hole.

* * * * *